US012415188B2

(12) United States Patent
King et al.

(10) Patent No.: US 12,415,188 B2
(45) Date of Patent: Sep. 16, 2025

(54) CLAMPING SYSTEM, BALANCING SYSTEM AND METHODS OF USE THEREOF

(71) Applicant: SPEX SamplePrep, LLC, Metuchen, NJ (US)

(72) Inventors: Gregory W. King, Carteret, NJ (US); Lea L. Anderson-Smith, Marlboro, NJ (US); Geoffrey B. Cohen, Somerville, NJ (US)

(73) Assignee: SPEX SamplePrep, LLC, Metuchen, NJ (US)

( * ) Notice: Subject to any disclaimer, the term of this patent is extended or adjusted under 35 U.S.C. 154(b) by 326 days.

(21) Appl. No.: 17/856,483

(22) Filed: Jul. 1, 2022

(65) Prior Publication Data

US 2023/0011579 A1 Jan. 12, 2023

Related U.S. Application Data

(60) Provisional application No. 63/219,565, filed on Jul. 8, 2021.

(51) Int. Cl.
*B02C 17/18* (2006.01)
*B02C 17/08* (2006.01)

(52) U.S. Cl.
CPC ............ *B02C 17/182* (2013.01); *B02C 17/08* (2013.01)

(58) Field of Classification Search
CPC .............................. B02C 17/182; B02C 17/08
See application file for complete search history.

(56) References Cited

U.S. PATENT DOCUMENTS 4,102,589 A * 7/1978 Haas ........................ B02C 17/14 74/579 E
6,334,583 B1 * 1/2002 Li ........................... B02C 17/08 977/777

(Continued)

FOREIGN PATENT DOCUMENTS

CN 112044535 A * 12/2020 ............. B02C 17/08
DE 20310654 U1 9/2003
DE 29724754 U1 9/2003

(Continued)

OTHER PUBLICATIONS

Communication dated Dec. 6, 2022, issued by the European Patent Office in related European Application No. 22 18 3913.

*Primary Examiner* — Mark A Williams
(74) *Attorney, Agent, or Firm* — ArentFox Schiff LLP

(57) ABSTRACT

A clamping system for a planetary ball mill includes a base, a clamping lid, including a clamping mechanism configured to secure a grinding container between the base and the clamping mechanism, and a lid configured to pivot with respect to the base from a closed position to an open position, wherein in the open position the grinding container is removable from the clamping system. The system further includes a rotatable arm configured to pivot between a first and second position, wherein in the first position the rotatable arm prevents the clamping lid from rotation to the open position. The clamping system also includes a balancing system having a first counterweight, with a linkage system being coupled between the first counterweight and a carrier plate of the planetary ball mill, the linkage system allowing the first counterweight to move with respect to a rotational axis of the carrier plate.

8 Claims, 19 Drawing Sheets

(56) References Cited

U.S. PATENT DOCUMENTS

| | | | | |
|---|---|---|---|---|
| 2005/0006506 | A1* | 1/2005 | McCartney | B02C 17/18 241/175 |
| 2008/0197223 | A1* | 8/2008 | Nagao | B02C 17/08 241/175 |

FOREIGN PATENT DOCUMENTS

| | | | | |
|---|---|---|---|---|
| DE | 102006047479 | A1 * | 4/2007 | B02C 17/08 |
| DE | 102010044254 | A1 * | 3/2012 | B02C 17/08 |
| DE | 102012009987 | A1 | 11/2013 | |

* cited by examiner

938

938

CLAMPING SYSTEM, BALANCING SYSTEM AND METHODS OF USE THEREOF

RELATED APPLICATIONS

This application claims priority to, and the benefit of, U.S. Provisional Application No. 63/219,565, Titled: "Clamping System, Balancing System and Methods of Use Thereof," filed on Jul. 8, 2021, the entirety of the contents of the preceding application is incorporated herein by reference, as if fully set forth in this document, for all purposes.

INTRODUCTION

The present disclosure generally relates to ball mills, particularly to a ball mill clamping system and a balancing system for planetary ball mills.

BACKGROUND

A ball mill may be used to grind a material into powder. The ball mill may include a grinding jar containing a plurality of grinding balls and a material to be ground. The ball mill typically rotates the grinding container about a longitudinal axis of the grinding container. As the grinding container rotates, the grinding balls roll along the inside of the grinding container and then fall onto the material to be ground, grinding the material to be ground into a fine powder.

Conventional ball mills may include clamping mechanisms in an attempt to clamp the container to the rotating ball mill. Conventional ball mill grinding container clamps frequently require a series of threaded shafts and nuts and a plate to sandwich the grinding container between two surfaces. Such clamping mechanisms are inefficient and tedious to install and remove. Further, in a conventional clamping mechanism it may be difficult to ensure that the grinding container is properly secured to the ball mill. Thus, the need exists to provide an improved clamping system and grinding container. In addition, conventional ball mills often have similarly difficult or tedious balancing procedures. Thus, there further exists a need to improve efficiency in balancing a ball mill.

SUMMARY

The following presents a simplified summary of one or more aspects of the invention in order to provide a basic understanding of such aspects. This summary is not an extensive overview of all contemplated aspects, and is intended to neither identify key or critical elements of all aspects nor delineate the scope of any or all aspects. Its purpose is to present some concepts of one or more aspects in a simplified form as a prelude to the more detailed description that is presented later.

In one aspect, the disclosure, a clamping system for a planetary ball mill is disclosed. The clamping system includes a base and a clamping lid including a clamping mechanism configured to secure a grinding container between the base and the clamping mechanism. The clamping lid is configured to pivot with respect to the base from a closed position to an open position, wherein in the open position the grinding container is removable from the clamping system. The system further includes a rotatable arm configured to pivot from a first position to a second position, wherein in the first position the rotatable arm prevents the clamping lid from rotation to the open position.

In another aspect, the disclosure, a planetary ball mill is disclosed. The planetary ball mill includes a carrier plate, a counterbalance system coupled to the carrier plate and a clamping system for clamping a grinding container to the carrier plate. The clamping system includes a base and a clamping lid including a clamping mechanism configured to secure a grinding container between the base and the clamping mechanism. The clamping lid is configured to pivot with respect to the base from a closed position to an open position, wherein in the open position the grinding container is removable from the clamping system. The system further includes a rotatable arm configured to pivot from a first position to a second position, wherein in the first position the rotatable arm prevents the clamping lid from rotation to the open position.

In another aspect of the disclosure, a balancing system for a planetary ball mill is disclosed. The balancing system includes a first counterweight and a linkage system coupled between the first counterweight and a carrier plate of the planetary ball mill via a linkage system, the linkage system allows the first counterweight to move with respect to a rotational axis of the carrier plate.

These and other aspects of the invention will become more fully understood upon a review of the detailed description, which follows.

DETAILED DESCRIPTION

Figure 1:
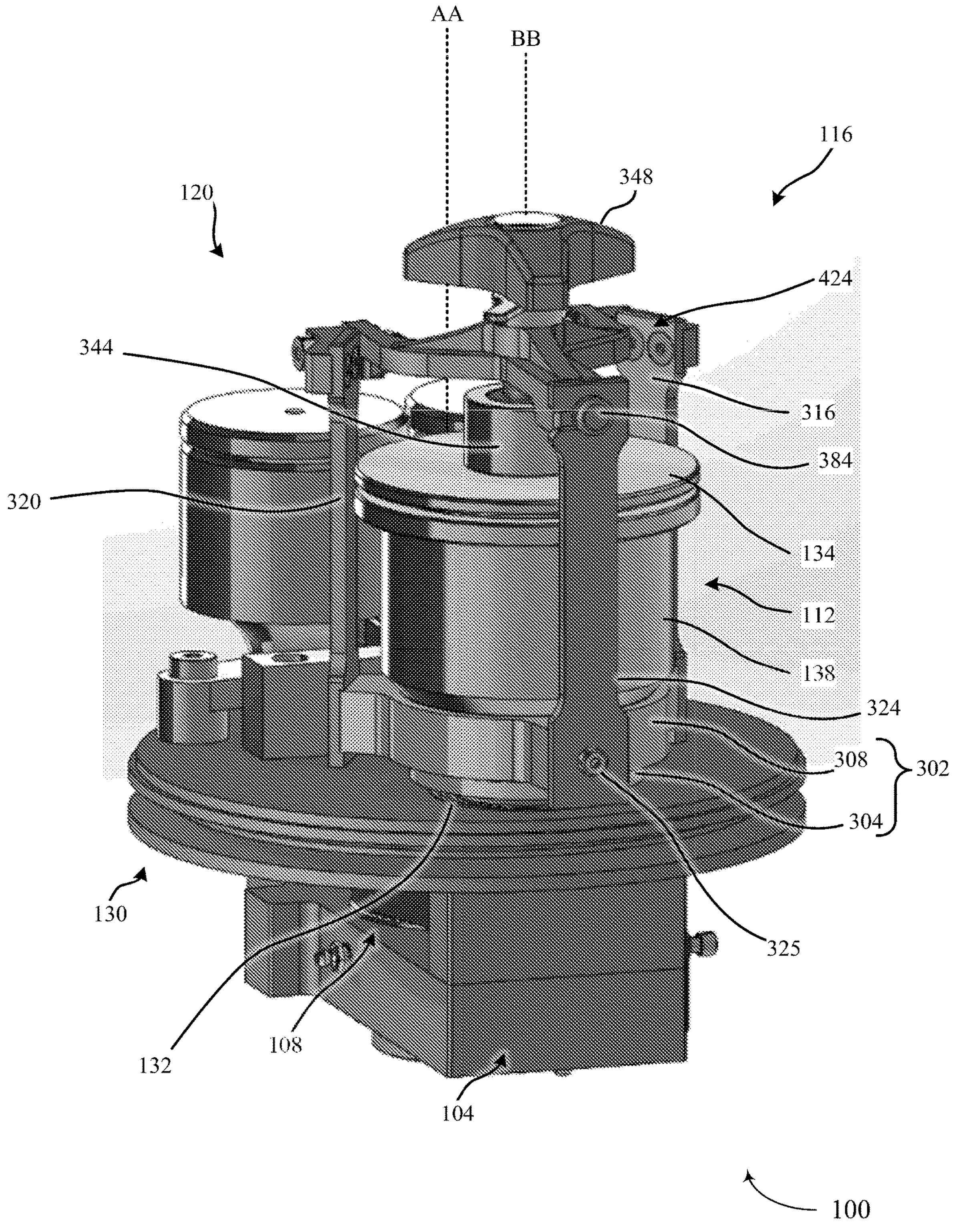
FIG. 1 is perspective view of an example planetary ball mill including a clamping system in a closed configuration, according to an aspect of the disclosure.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known components are shown in block diagram form in order to avoid obscuring such concepts.

I. TERMINOLOGY

Throughout the disclosure, the terms substantially or approximately may be used as a modifier for a geometric relationship between elements or for the shape of an element or component. While the terms substantially or approximately are not limited to a specific variation and may cover any variation that is understood by one of ordinary skill in the art to be an acceptable variation, some examples are provided as follows. In one example, the term substantially or approximately may include a variation of less than 10% of the dimension of the object or component. In another example, the term substantially or approximately may include a variation of less than 5% of the object or component. If the term substantially or approximately is used to define the angular relationship of one element to another element, one non-limiting example of the term substantially or approximately may include a variation of 5 degrees or less. These examples are not intended to be limiting and may be increased or decreased based on the understanding of acceptable limits to one of skill in the relevant art.

For purposes of the disclosure, directional terms are expressed generally with relation to a standard frame of reference when the system and apparatus described herein is installed in an in-use orientation. Further, in order to provide context to the current disclosure, a broad overview of the discovered deficiencies of various systems and an example implementation of the current disclosure and the advantages provided by the disclosure are described below. Further details of example implementations of the current disclosure are described in detail with reference to the figures below.

Terms such as a, an, and the are not intended to refer to only a singular entity, but include the general class of which a specific example may be used for illustration. The terms a, an, and the may be used interchangeably with the term at least one. The phrases at least one of and comprises at least one of followed by a list refers to any one of the items in the list and any combination of two or more items in the list. All numerical ranges are inclusive of their endpoints and non-integral values between the endpoints unless otherwise stated.

The terms first, second, third, and fourth, among other numeric values, may be used in this disclosure. It will be understood that, unless otherwise noted, those terms are used in their relative sense only. In particular, in some aspects certain components may be present in interchangeable and/or identical multiples (e.g., pairs). For these components, the designation of first, second, third, and/or fourth may be applied to the components merely as a matter of convenience in the description of one or more of the aspects of the disclosure.

For context, an overview is provided of aspects of the disclosure and the advantages the disclosure provides. This overview, and the detailed description that follows, has been presented for purposes of illustration and description. It is not intended to be exhaustive nor to limit the disclosure to the forms described. Numerous modifications are possible in light of the above teachings, including a combination of the abovementioned aspects. Some of those modifications have been discussed and others will be understood by those skilled in the art. The various aspects were chosen and described in order to best illustrate the principles of the present disclosure and various aspects as are suited to the particular use contemplated. The scope of the present disclosure is, of course, not limited to the examples or aspects set forth herein, but can be employed in any number of applications and equivalent devices by those of ordinary skill in the art. Rather, it is hereby intended the scope be defined by the claims appended hereto.

II. OVERVIEW

Figure 2:
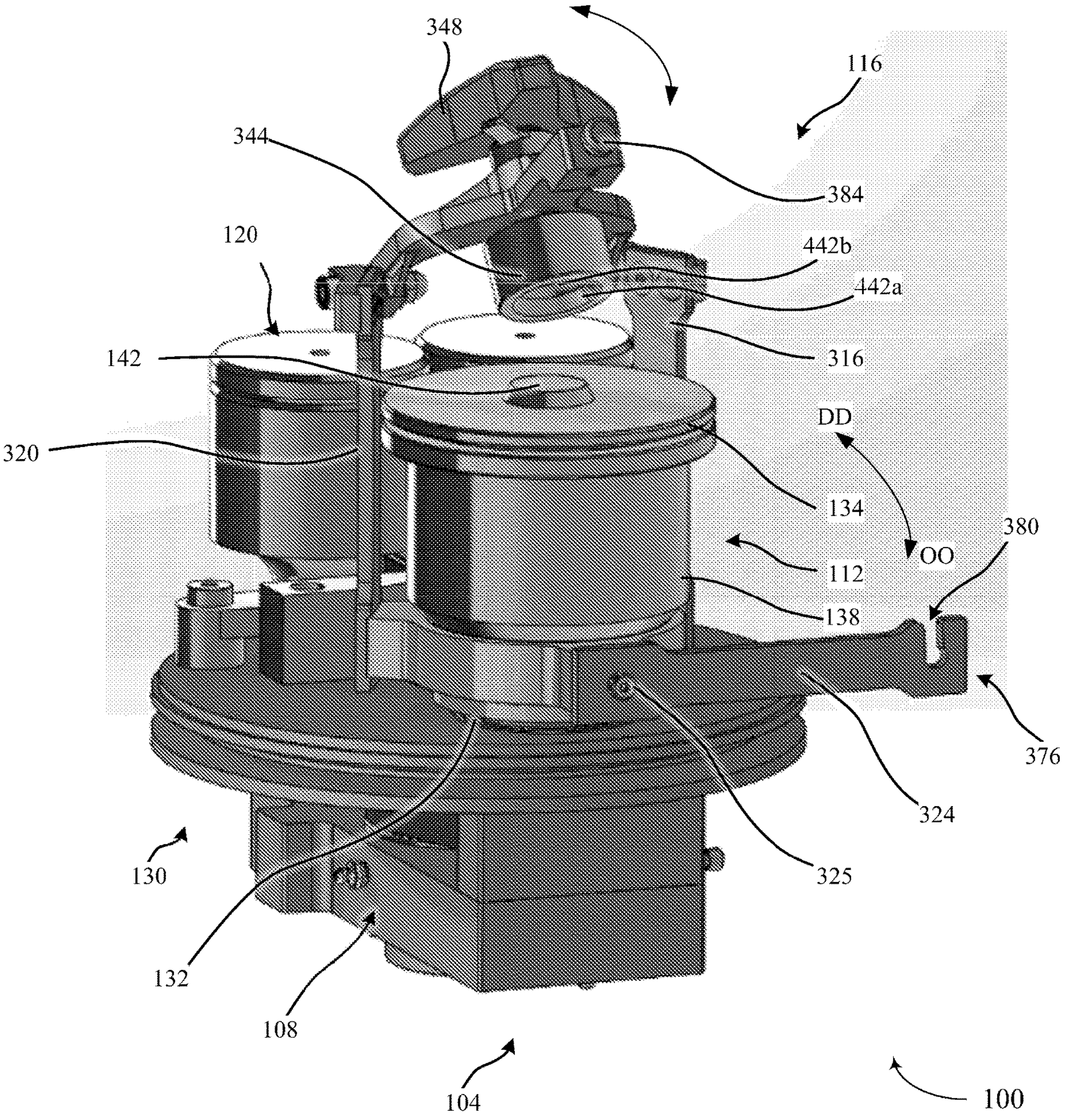
FIG. 2 is perspective view of the planetary ball mill of FIG. 1 with the clamping system in an open configuration, according to an aspect of the disclosure.

As described in further detail below, aspects of the disclosure relate to an improved clamping system that simplifies the installation and removal—and securing of a grinding container 112 in to a ball mill 100. Turning to FIGS. 1 and 2, the clamping system 116 may include a base plate or ring 308 and a clamping lid 424 with a clamping member 344. As shown in FIG. 2, a support 324 connecting the base ring 308 may configured to be pivoted to disengage from a boss 384 which allows the clamping lid 424 to be pivoted away form a grinding container 112. Once the clamping lid 424 is pivoted away from the grinding container 112 the grinding container may be easily removed from the clamping system 116. Similarly, a grinding container 112 may be easily installed and secured into the clamping system 116 by placing the grinding container into the clamping system and pivoting the clamping lid 424 into engagement with the lid of the grinding container 112. Once the grinding container is in place, the support 324 may be pivoted upwards and into engagement with the boss 384 as shown in FIG. 1 and a clamp screw handle 348 may be rotated to cause the clamping member 344 to tighten down onto the lid of the grinding container 112. The aforementioned system greatly increases the efficiency in securing and removing grinding containers 112 from a ball mill. Further, the aspects described below provide a secure connection between the ball mill and the grinding container.

In another aspect described below, a balancing system is described. The balancing system allows a user to easily balance a ball mill by simply turning a knob. Additional aspects are described below.

III. DETAILED EXAMPLES

FIG. 1 illustrates a partial perspective view of an example ball mill 100 with an example clamping system 116 according to aspects of the disclosure in a first, or closed, configuration. It is noted that external features (e.g., the outer casing) of the ball mill are omitted from FIGS. 1 and 2 to prevent obstruction of aspects of the disclosure. In one example, the planetary ball mill may be a commercially available benchtop planetary ball mill. For example, aspects of the disclosure may be usable with commercially available ball mill's such as the Retsch PM100, manufactured by Retsch of Germany; the Fritsch Pulverisette 6, manufactured by Fritsch of Germany, The Tencan Heavy-duty Full-directional Planetary Ball Mill, manufactured by Tencan of China, and/or planetary mills manufactured by Across International of New Jersey. Examples of ball mills having aspects that may be useable with the disclosure are described by Limb in U.S. Pat. No. 2,874,911, titled: Compound Movement Centrifugal Ball-Mill; Gamblin in U.S. Pat. No. 5,205,499, titled: Planetary Grinding Apparatus, the entirety of which are incorporated by reference herein.

FIG. 2 is a perspective view of the example ball mill 100 with the example clamping system 116 in accordance with the disclosure in a second, or open configuration. The ball mill 100 and clamping system 116 may include a motor 104, a gear train 108 (hidden from view in FIGS. 1 and 2), a grinding container 112, and a balancing system 120.

The motor 104 may be configured to drive the gear train 108. The gear train 108 may for example be a planetary gear system. For example, an output shaft of the motor 104 may be coupled to a sun gear (not shown) of the gear train 108. The sun gear may engage and drive one or more planetary gears (not shown) coupled to a ring gear. The ring gear may be coupled to or formed in a carrier plate 130. The clamping system 116 and the balancing system 120 are coupled to the carrier plate 130 such that the clamping system 116 and the balancing system 120 rotate with the carrier plate 130 (e.g., about axis AA shown in FIG. 1). Further, any one or combination of the planetary gears may cause rotation of the clamping system and/or grinding container clamped therein about axis BB shown in FIG. 1. The clamping system 116 is configured to engage the grinding container 112 and secure the grinding container 112 during rotation. It is noted that while a planetary ball mill 100 is provided as an example, aspects of the current disclosure are likewise applicable to any system that requires or is improved by the secure clamping of a container or grinding container for application of a rotational and/or vibrating motion to the container clamped therein.

Figure 3:
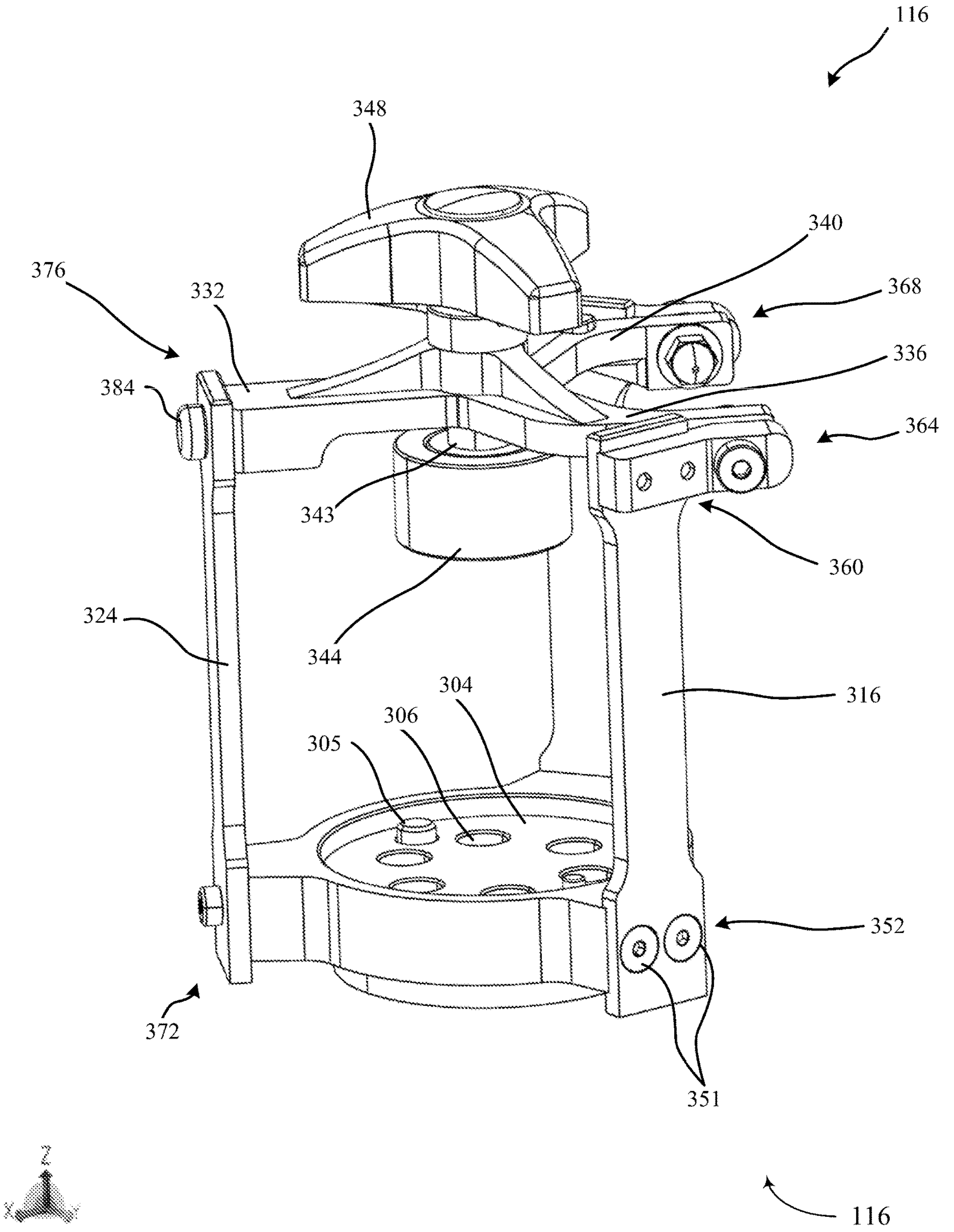
FIG. 3 is a side view of the clamping system of the planetary ball mill of FIGS. 1 and 2.
Figure 4:
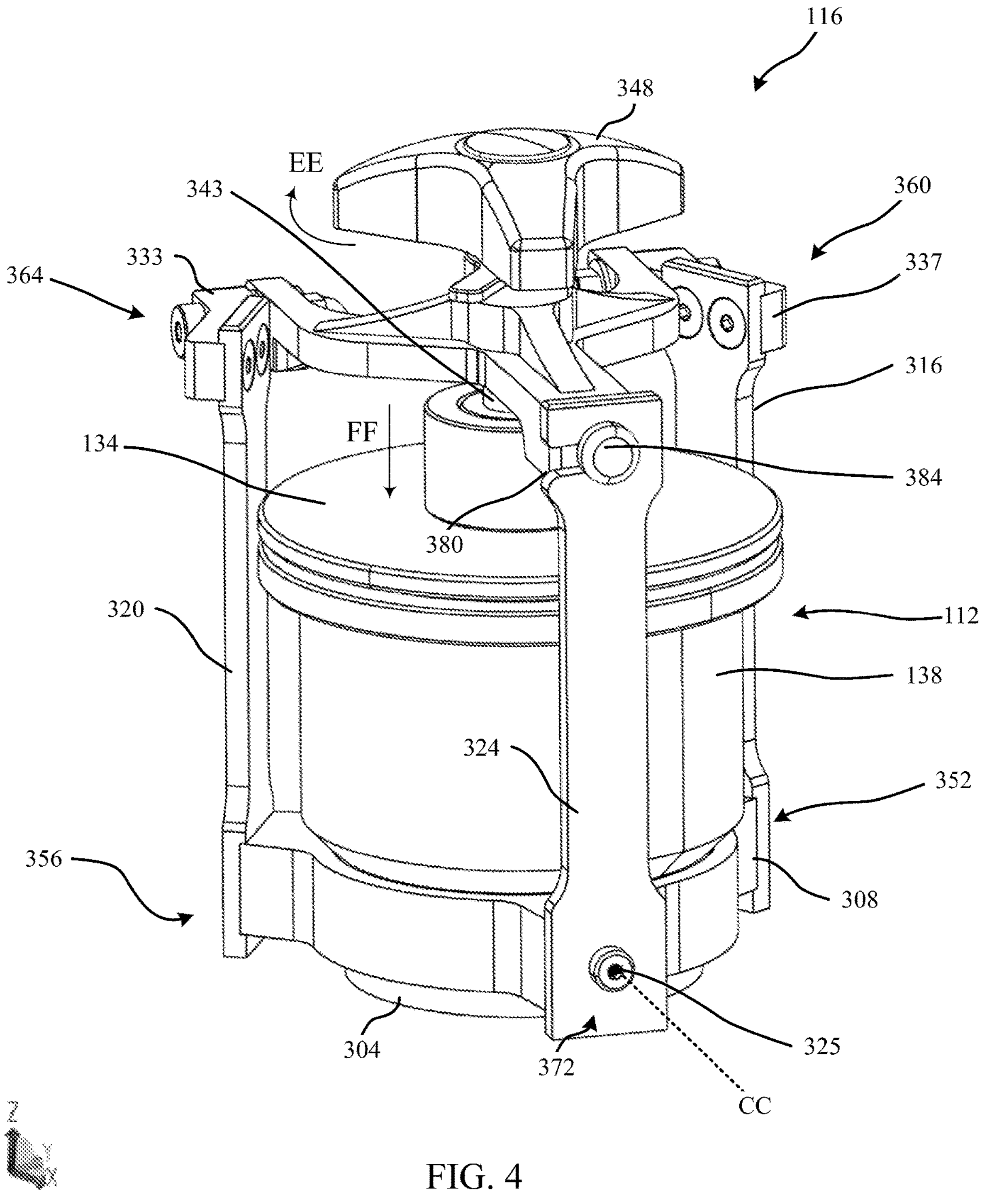
FIG. 4 is a front view of the clamping system of the planetary ball mill of FIGS. 1-3 engaged with a grinding container.
Figure 5:
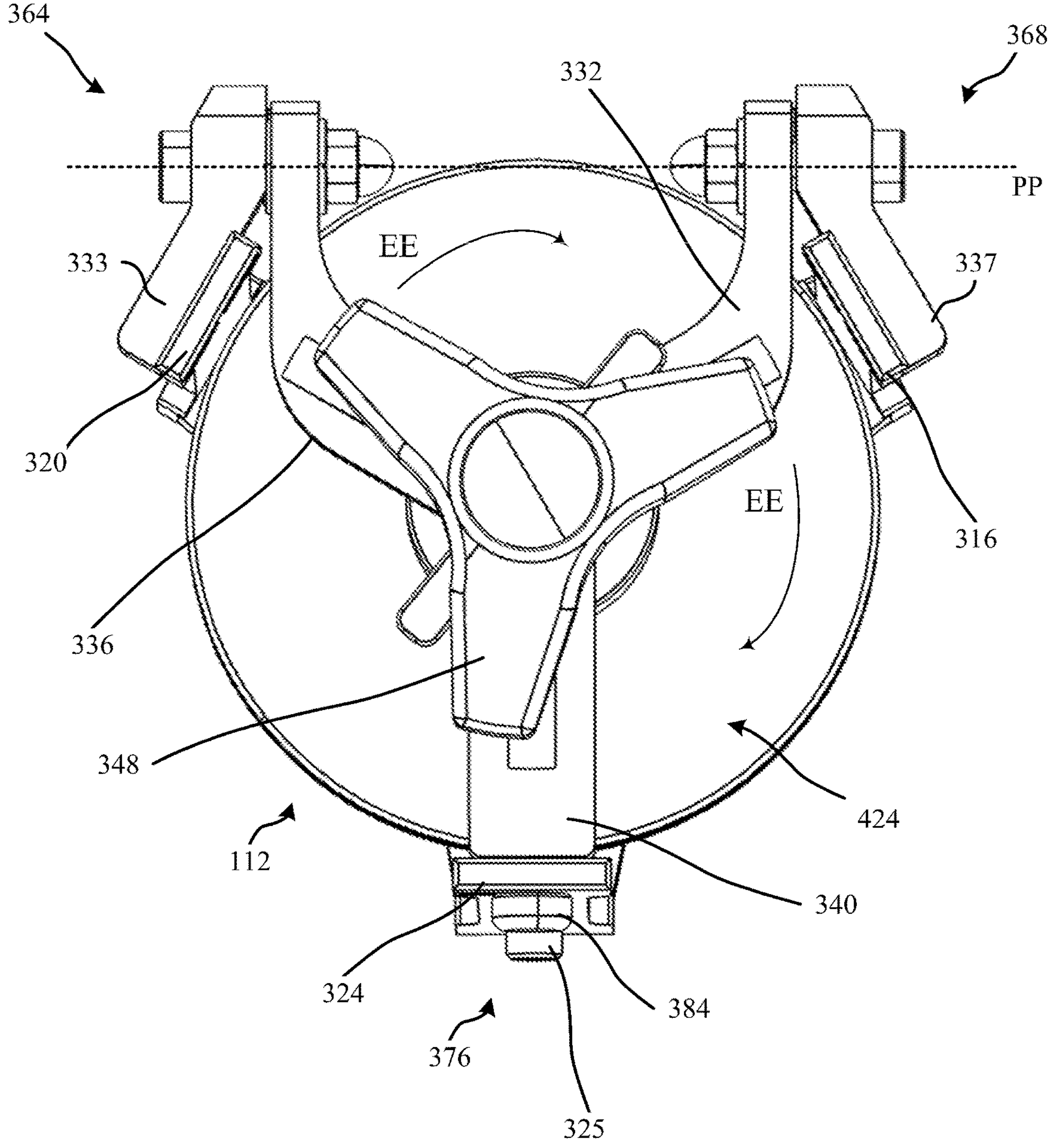
FIG. 5 is a top view of the clamping system of the planetary ball mill of FIGS. 1-4 engaged with a grinding container.

FIG. 3 illustrates a side perspective view of the clamping system 116 without the grinding container 112 (FIGS. 1 and 2) clamped therein. FIG. 4 is a front perspective view of the clamping system 116 engaged with the grinding container 112. FIG. 5 is a top view of the clamping system 116 engaged with the grinding container 112. As shown in FIG. 1, the clamping system 116 includes a base member 302, which includes a base plate 304 and a base ring 308 The base plate 304 is coupled to the base ring 308. A portion of the base plate 304 is received within an opening 132 (FIGS. 1-2) of the carrier plate 130 and is coupled to and/or includes a gear configured to engage the sun gear of the gear set 108 to facilitate rotation of the clamping system 116 (e.g., about axis BB in FIG. 1) as the carrier plate 130 rotates.

The clamping system may further include a clamping lid 424 (FIG. 5), a first support arm 316, a second support arm 320, and a third support arm 324. The first support arm 316, second support arm 320, and/or third support arm 324 may be connected to the base ring 308. In one example, the first support arm 316 and second support arm 320 may be fixedly connected to the base ring 308 via one or more fasteners at first ends thereof (e.g., at respective first ends 352, 356). In one example, the first support arm 316 and/or second support arm 320 may be connected to the base ring 308 so as to not be rotatable with respect to the base ring 308. For example, the first support arm 316 and/or second support arm may be connected to the base ring via two or more threaded fasteners that are configured to be threadably engaged with a respective plurality of threaded holes in the base ring 308. One example of the aforementioned fastener configuration is shown as reference 351 in FIG. 3.

Further, as shown in FIGS. 1, 2, and 4, the third support arm 324 may for example be pivotally connected to the base ring 308 at a first end 372 and configured to pivot or rotate about axis CC (FIG. 4) in a first direction DD (FIG. 2) and/or a second direction OO. The third support arm 324 may be configured to pivot from a first closed or clamped configuration (e.g., as shown in FIG. 1) to a second open configuration (e.g., as shown in FIG. 2). In one example implementation that allows the third support arm 324 to pivot about axis CC, the third support arm 324 may for example be connected to the base ring 308 via single threaded fastener (e.g., threaded fastener 325 in FIGS. 1, 2, and 4). It is noted that while a threaded fastener is shown, any configuration that allows the third support arm 324 to pivot may be implemented without departing from the scope of the disclosure (e.g., a bearing configuration, a bushing configuration, a slip fit rivet or other rotatable interface). Additional discussion relating to the operation of the clamping system is described in further detail below.

The first support arm 316, second support arm 320 and/or third support arm 324 may be connected to or connectable to a clamping lid configuration at second ends thereof (e.g., at respective second ends 360, 364, and/or 376). Turning to FIG. 5, the clamping lid 424 may include a clamping body 328 which may include a first clamping body arm 332, a second clamping body arm 336, and a third clamping body arm 340, a clamping member 344, and a clamp screw handle 348. The clamp screw handle 348 is configured to engage the clamping member 344 with a lid 134 of the grinding container 112. In one example, the clamping body 328 may include a threaded portion configured to threadably engage with a threaded shaft (e.g., shaft 343 shown in FIGS. 3 and 4). The shaft 343 may have the clamping member 344 connected at a first end and the clamp screw handle 348 connected at the second end. In one example the clamp screw handle 348 may be fixed to the second end so that rotation of the clamp screw handle 348 causes rotation of the threads on the shaft 343 within the corresponding threads of the clamping body 328, thus causing linear advancement of the clamping member 344. For example, turning to FIG. 4, rotation of the clamp screw handle 348 in the direction EE denoted by the arrow causes the clamping member 344 to advance in direction FF denoted by the arrow in FIG. 4.

Thus, as described in further detail below, a user may rotate the clamp screw handle 348 to tighten the clamping member 344 against lid 134. The aforementioned example may not only ensure that the grinding container 112 is securely mounted, but may also ensure that the lid 134 of the grinding container 112 is properly engaged and sealed with the bowl 138 of the grinding container 112. In one example, the clamping member 344 may be rotatably connected to shaft via a bearing, bushing or other rotatable interface to allow a user to more easily rotate the clamp screw handle 348 once the clamping member 344 has made contact with the lid 134 during the tightening process.

While one specific example is provided above, alternative methods of applying a downward force to the lid 134 of the grinding container 112 may be used without departing from the scope of the disclosure. For example, the clamping member 344 may be biased downward via a spring or other biasing member. In another example, the clamping member 344 may be connected to a spring cam mechanism that is configured to release spring pressure and thus apply a downward force to the lid 134 of the grinding container when the clamp screw handle is rotated or otherwise activated. Mechanisms for providing the aforementioned downward force, including the non-limiting example described above, may hereinafter be interchangeably referred to as a clamping mechanism.

Turning to FIGS. 4 and 5, the support arms 316, and 320 may be coupled between the base ring 308 and the clamping lid 424. As mentioned above, a first end 352 of the first support arm 316 and a first end 356 of the second support arm 320 may be fixedly coupled to the base ring 308. In one example, the first support arm 316 and/or second support arm 320 may be connected to the base ring 308 so as to not be rotatable with respect to the base ring 308. For example, the first support arm 316 and/or second support arm may be connected to the base ring via two or more threaded fasteners that are configured to be threadably engaged with a respective plurality of threaded holes in the base ring 308. One example of the aforementioned fastener configuration is shown as reference 351 in FIG. 3. A second end 360 of the first support arm 316 and a second end 364 of the second support arm 320 may be fixedly connected to a first pivot mount 333 and a second pivot mount 337, The first pivot mount 333 and second pivot mount 337 may be configured to allow the clamping lid 424 to pivot with respect to the first support arm 316 and second support arm 320 about an axis PP (FIG. 5). For example, the first pivot mount 333 and second pivot mount 337 may be configured to allow for rotational movement of the second clamping body arm 336 and first clamping body arm 332 with respect to the first support arm 316 and second support arm 320 via hinges 364 and 368. A first end 372 of the third arm 324 is rotatably coupled to the base ring 308. A second end 376 of the third arm 324 includes a notch 380 that is configured to engage a boss 384 extending from the third clamping body arm 340 of the clamping lid 424. The third arm 324 is movable between a first position (FIG. 1) in which the notch 380 is engaged with the boss 384 clamping lid 424 and a second position (FIG. 2) in which the notch 380 is disengaged from the boss 384 of the clamping lid 424. In the first position, the position of the clamping lid 424 with respect to the base ring 308 is fixed so that the grinding container 112 may be secured between the clamping member 344 and the base plate 304. When the third arm 424 is in the first position, the clamp screw handle 348 may also be actuated (e.g., rotated) to secure the clamping member 344 to the grinding container lid 134, thereby preventing the grinding container 112 from opening or otherwise moving undesirable during rotation of the ball mill. When the third arm 324 is in the second position, the clamping lid 424 may be pivoted toward or away from the grinding container 112 allowing for the grinding container 112 to be easily removed. It is noted that while a combination of pivoting downward of the clamping lid 424, engagement of the third support arm 324 with the boss 384 and the actuation of the clamp screw handle 348 thereafter is described above, in one example the clamping member 344 may be configured to automatically apply a downward force to the container lid once clamping lid 424 is pivoted downward. For example, the clamping member 344 may be downwardly biased via a spring or other biasing member so that pressing downward on the clamping lid 424 causes a downward force to be applied to the lid 134 of grinding container 112.

Figure 6:
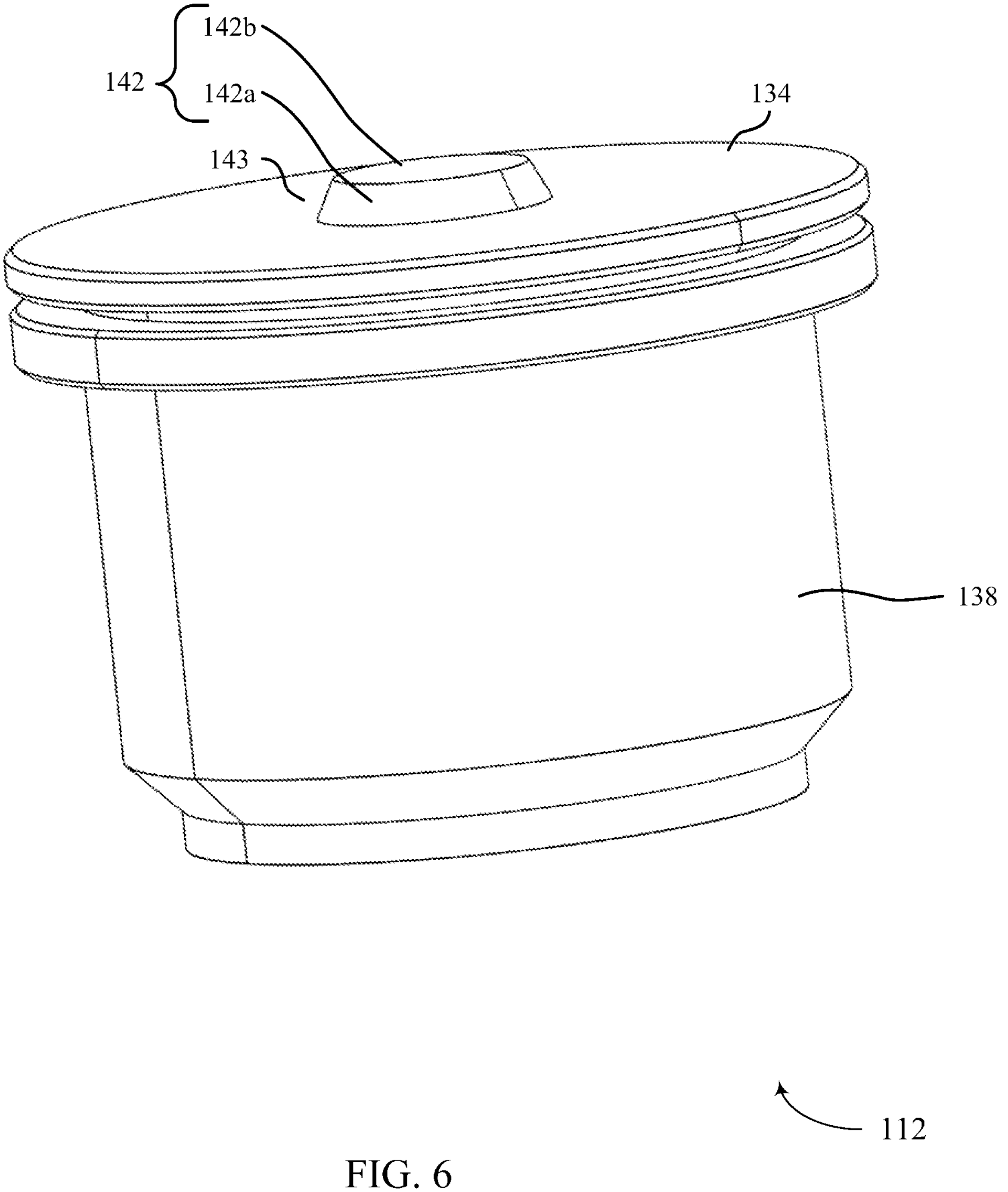
FIG. 6 is a perspective view of an example grinding container for use with the planetary ball mill of FIGS. 1-5.
Figure 7A:
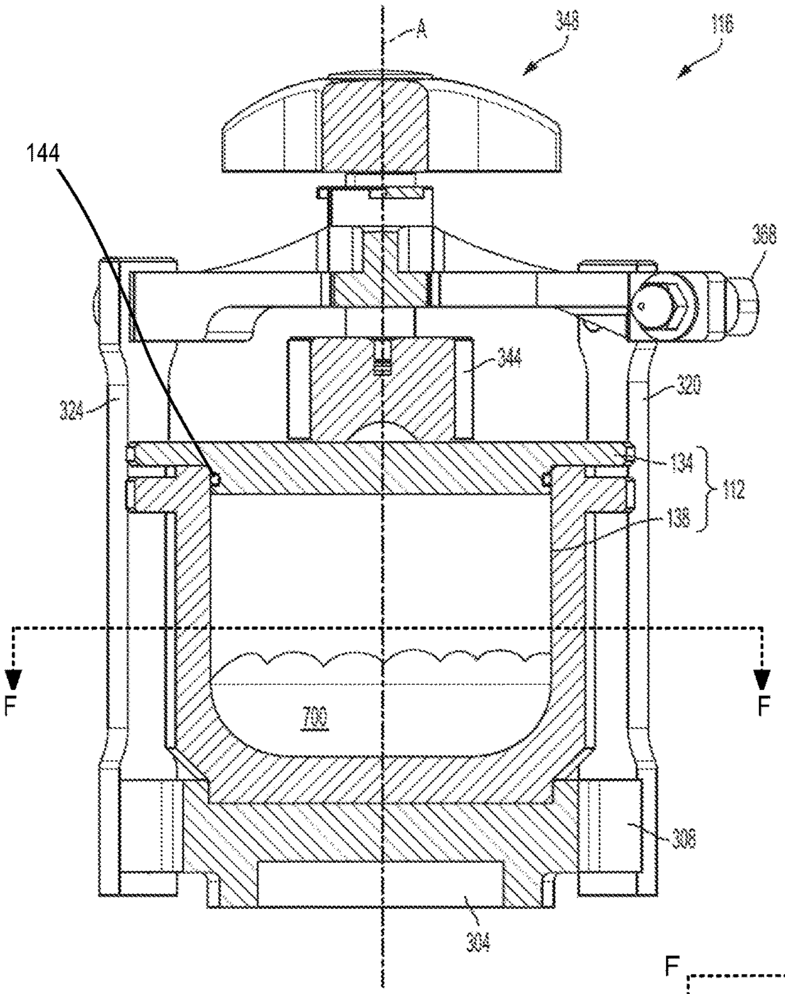
FIG. 7A is a section view of the clamping system of the planetary ball mill of FIGS. 1-5 engaged with the grinding container of FIG. 6.
Figure 9A:
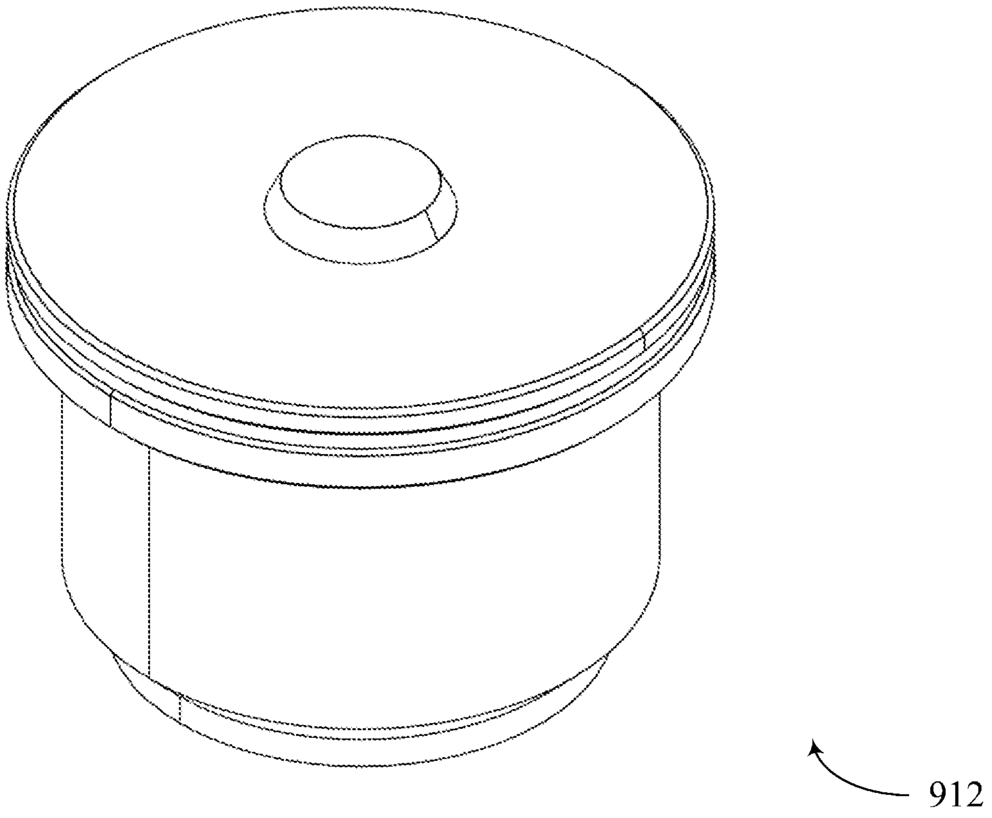
FIG. 9A is a perspective view of an example grinding container design according to aspects of the disclosure.
Figure 9B:
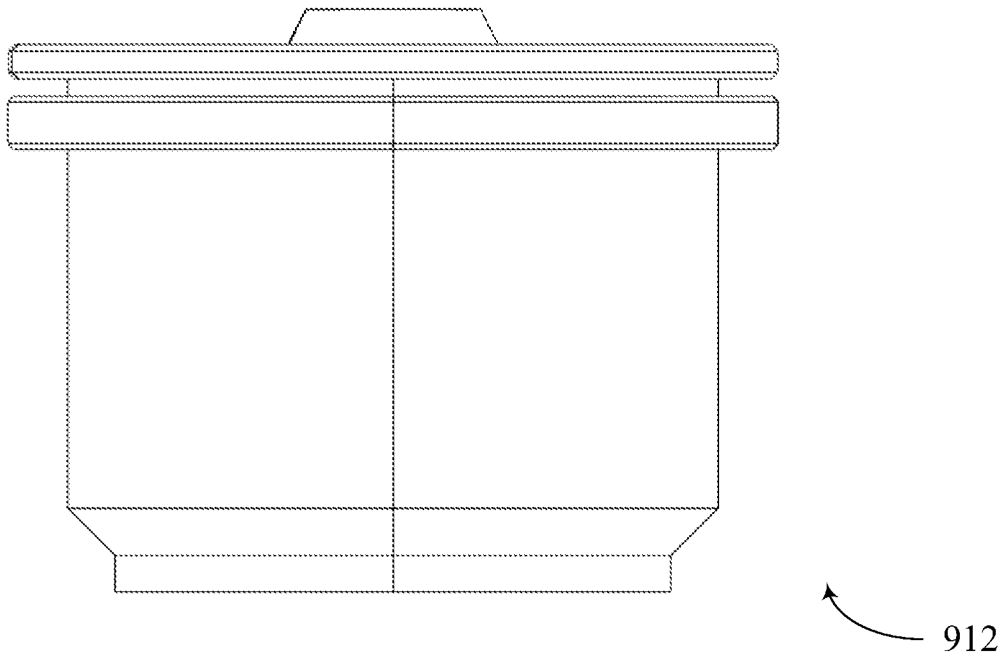
FIG. 9B is front view of the example grinding container of FIG. 9A according to aspects of the disclosure.
Figure 9C:
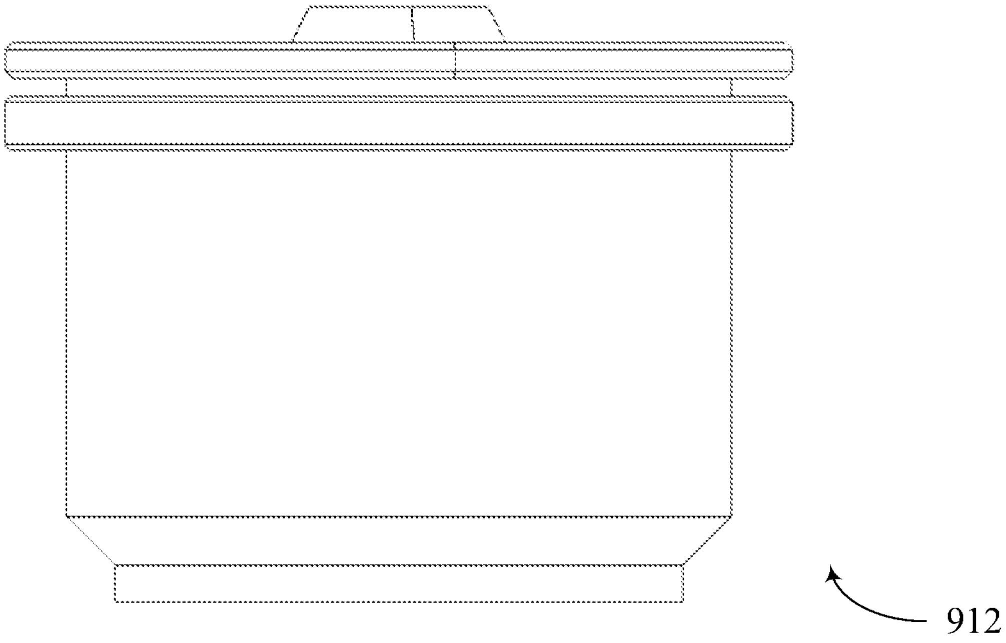
FIG. 9C is a left side view of the grinding container of FIGS. 10A and 10B according to aspects of the disclosure.
Figure 9D:
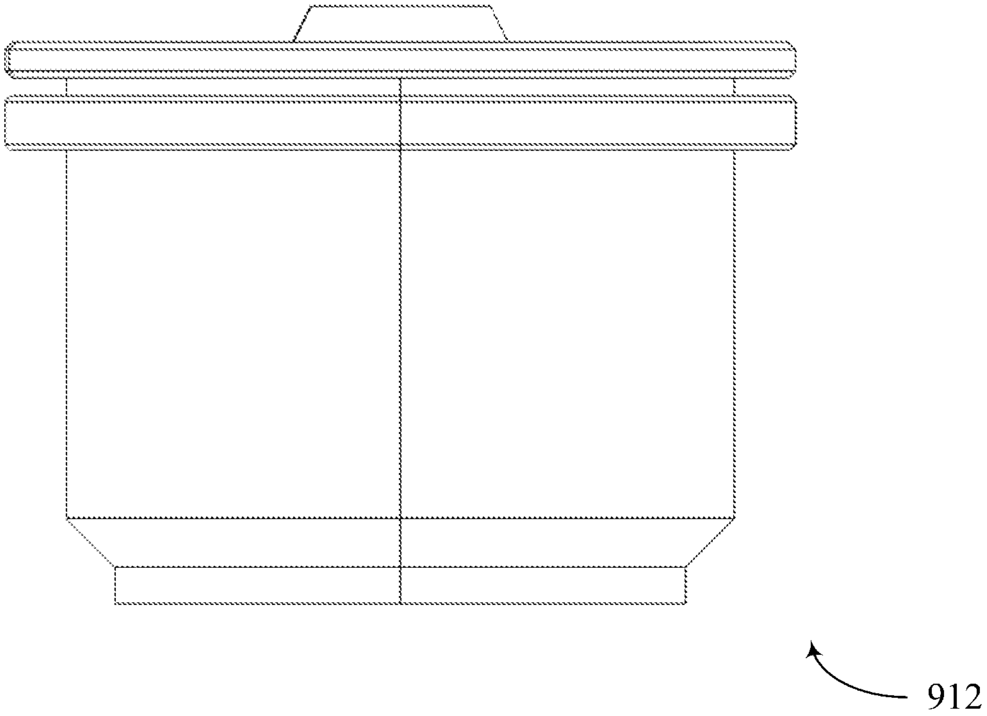
FIG. 9D is a rear view of the grinding container of FIGS. 10A-10C according to aspects of the disclosure.
Figure 9E:
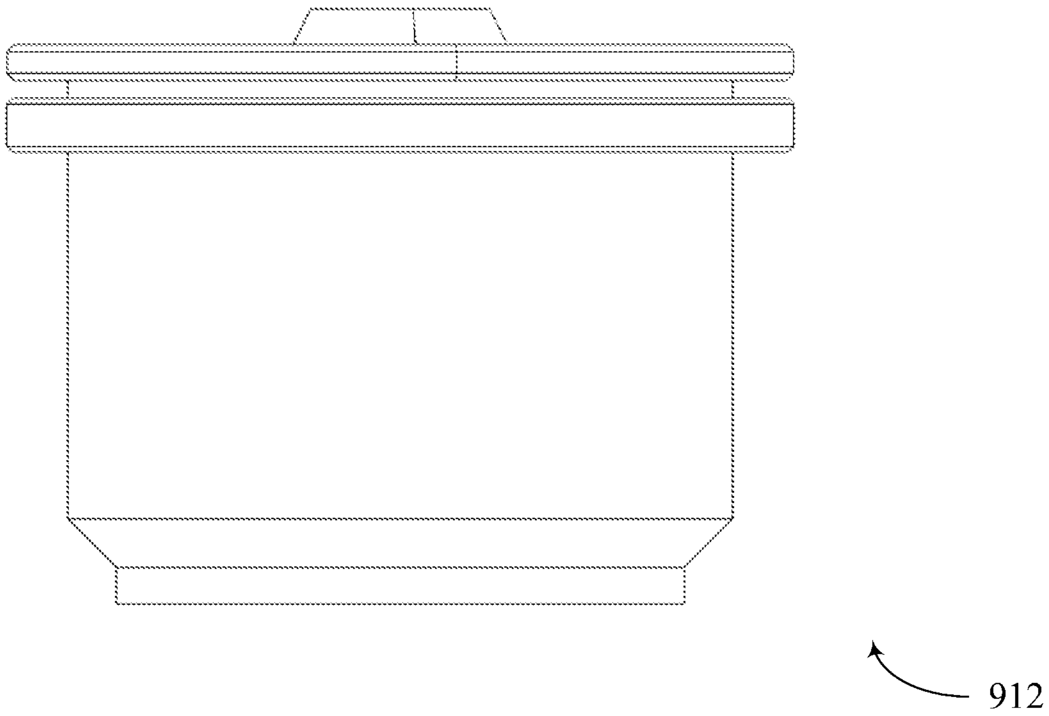
FIG. 9E is a right side view of the grinding container of FIGS. 9A-9D according to aspects of the disclosure.
Figure 9F:
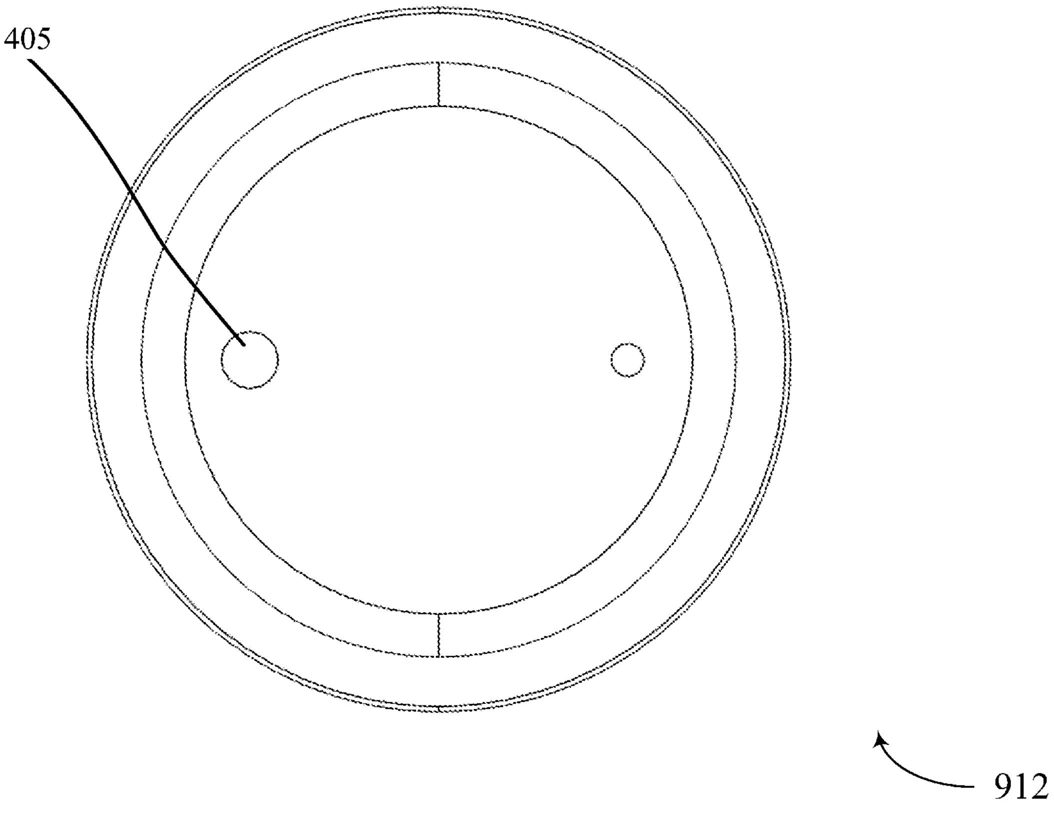
FIG. 9F is a bottom view of the grinding container of FIGS. 9A-9E according to aspects of the disclosure.
Figure 9G:
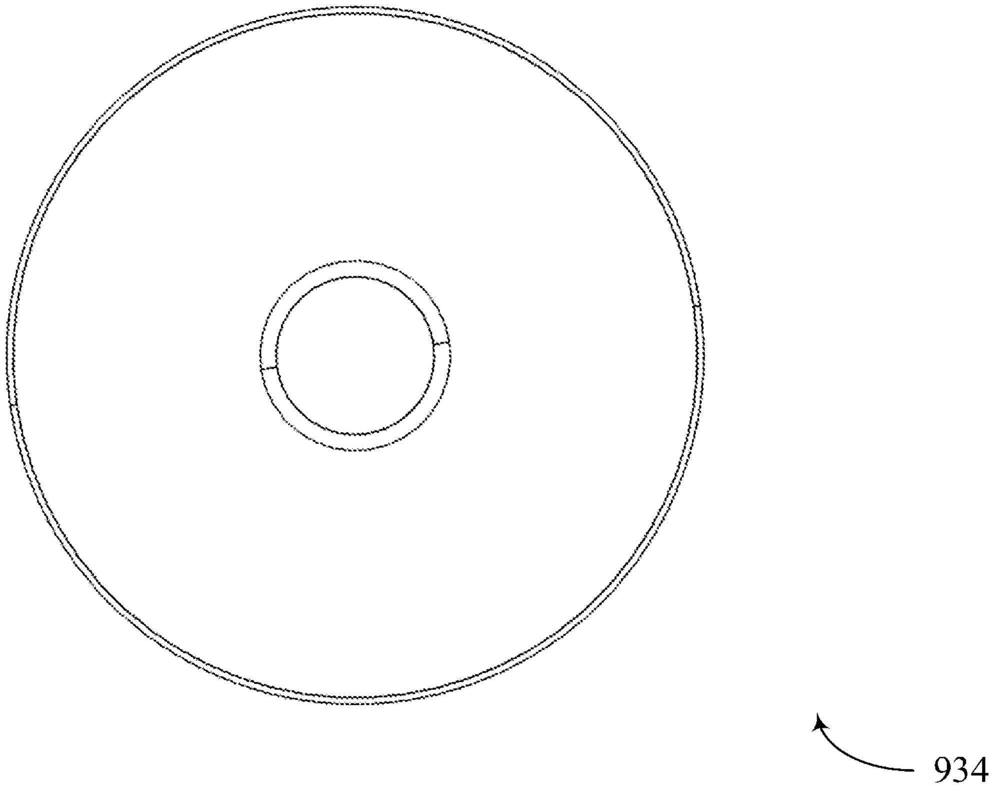
FIG. 9G is a top view of the grinding container of FIGS. 9A-9F according to aspects of the disclosure.
Figure 10A:
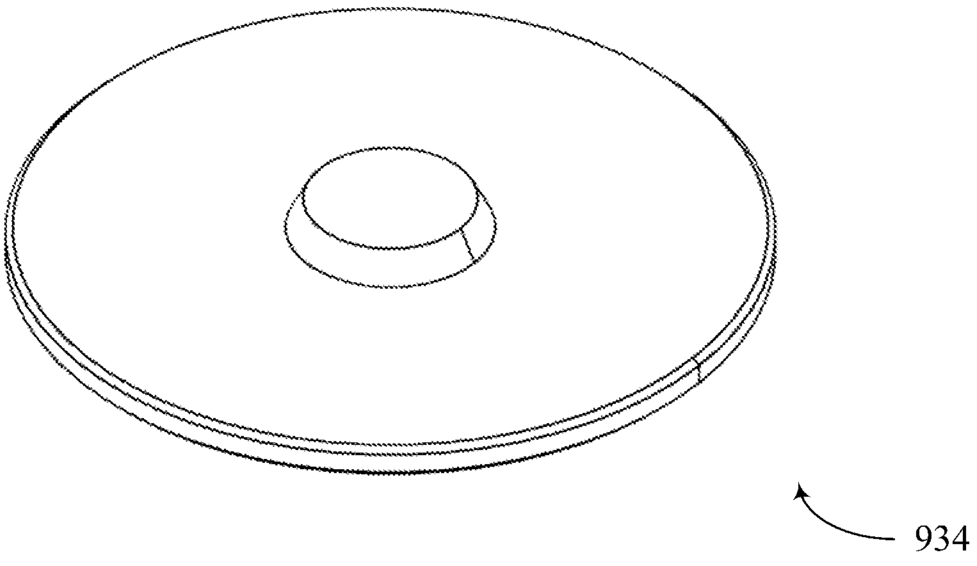
FIG. 10A is a perspective view of an example grinding container lid design according to aspects of the disclosure.
Figure 10B:
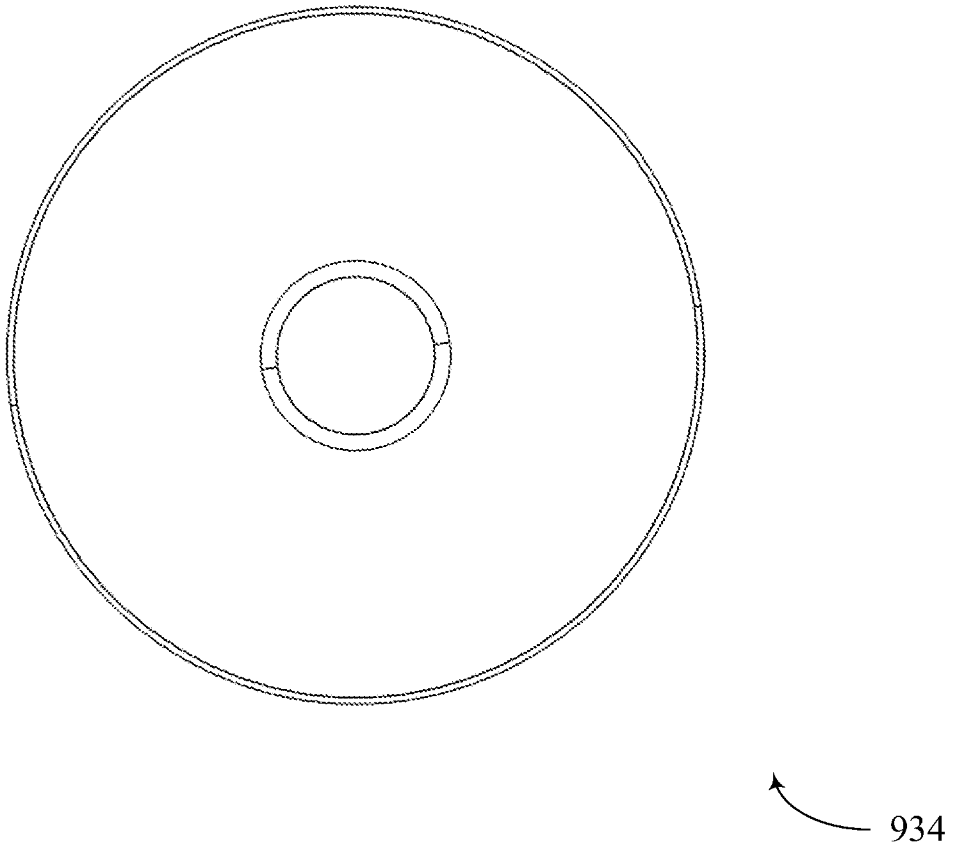
FIG. 10B is top view of the example lid of FIG. 10A according to aspects of the disclosure.
Figure 10C:
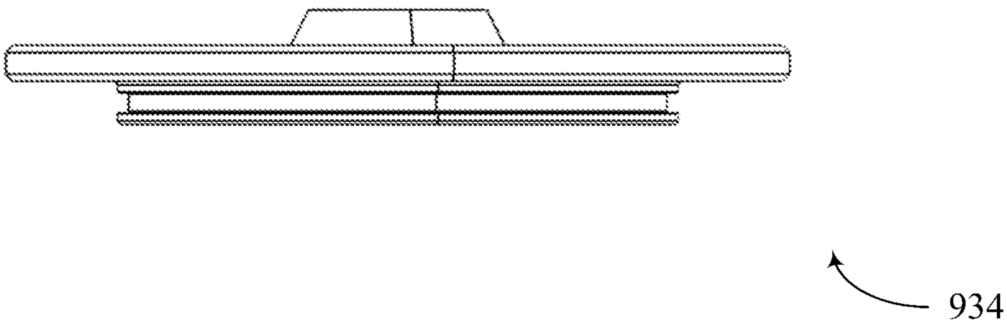
FIG. 10C is a left side view of the lid of FIGS. 10A and 10B according to aspects of the disclosure.
Figure 10D:
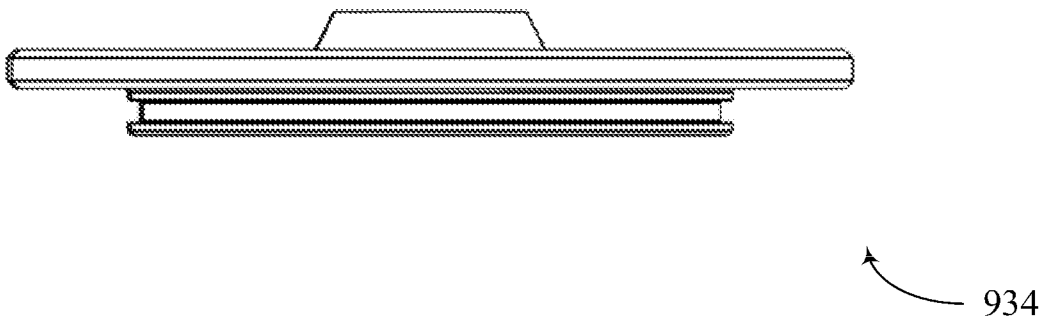
FIG. 10D is a rear view of the lid of FIGS. 10A-10C according to aspects of the disclosure.
Figure 10E:
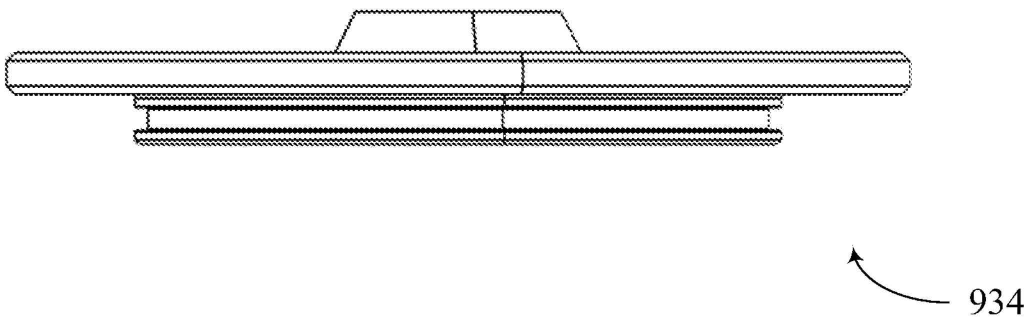
FIG. 10E is a right side view of the lid of FIGS. 10A-10D according to aspects of the disclosure.
Figure 10F:
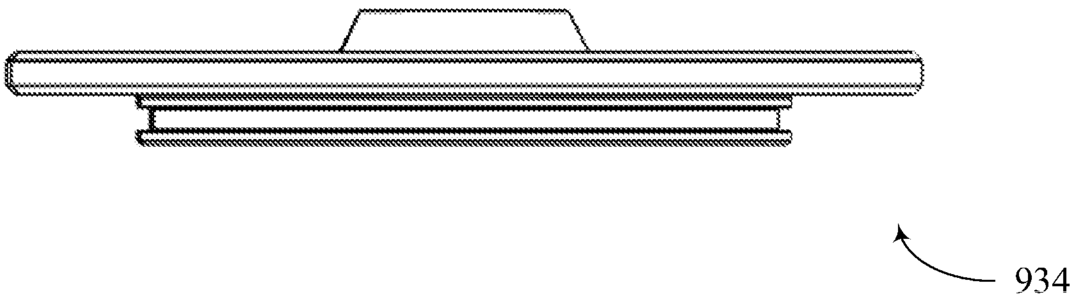
FIG. 10F is a front view of the lid of FIGS. 10A-10E according to aspects of the disclosure.
Figure 10G:
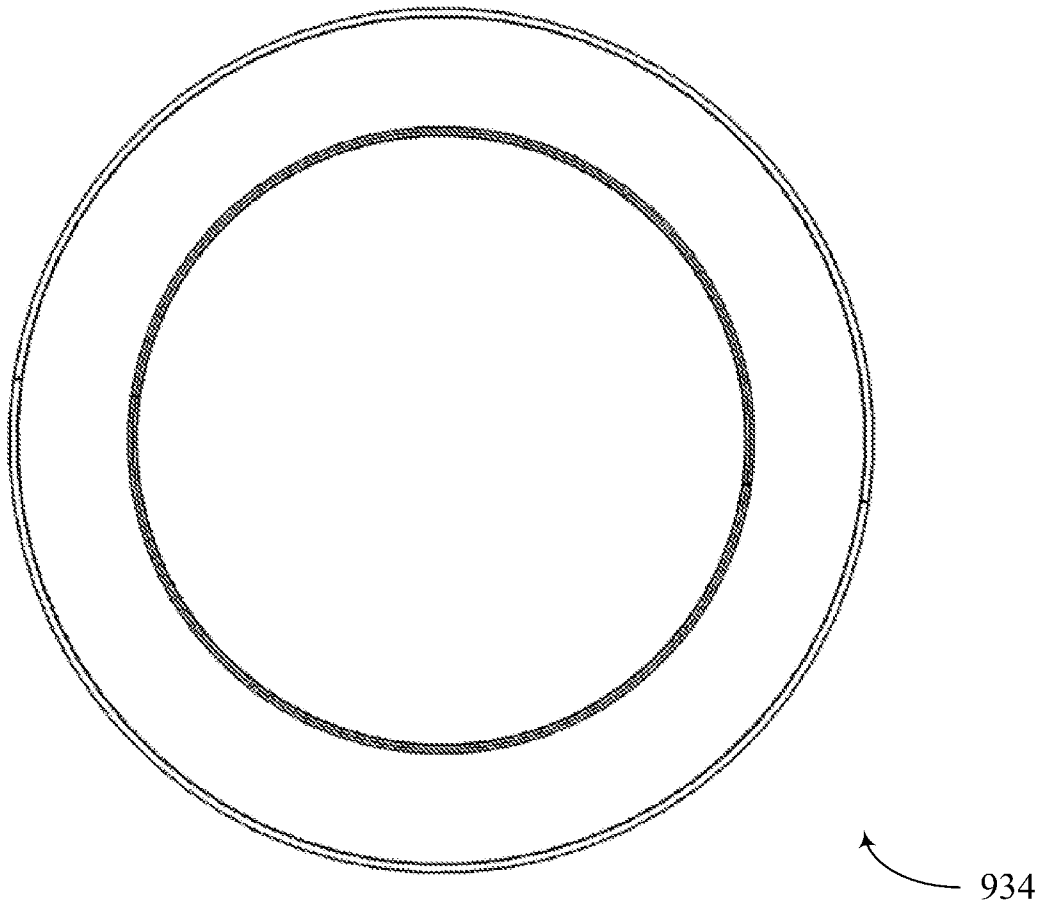
FIG. 10G is a bottom view of the lid of FIGS. 10A-10F according to aspects of the disclosure.
Figure 11A:
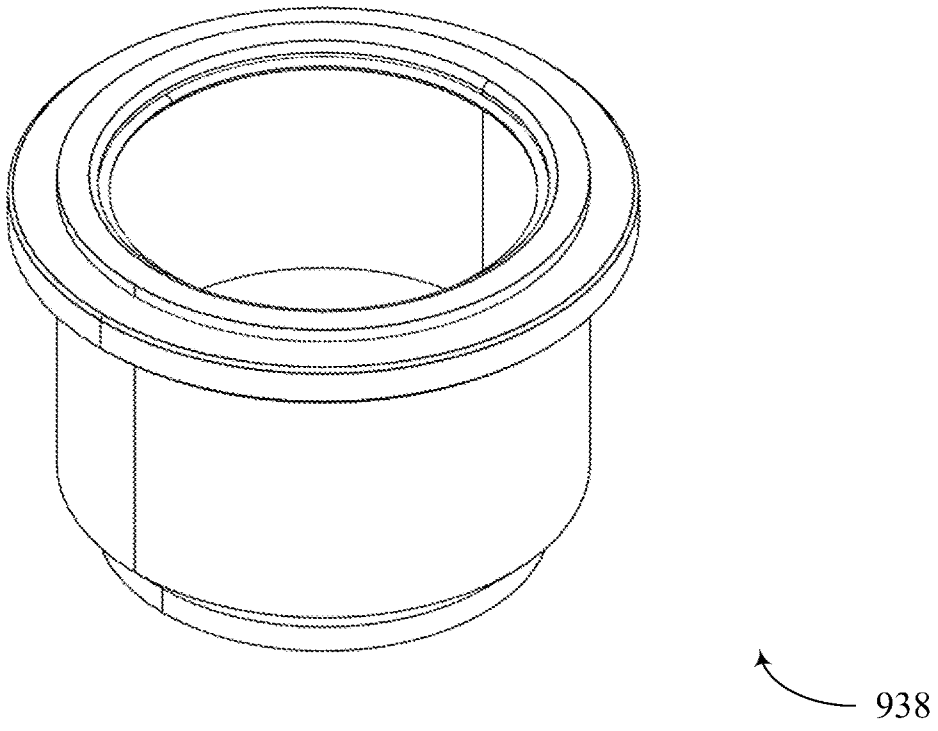
FIG. 11A is a perspective view of an example grinding container bowl design according to aspects of the disclosure.
Figure 11B:
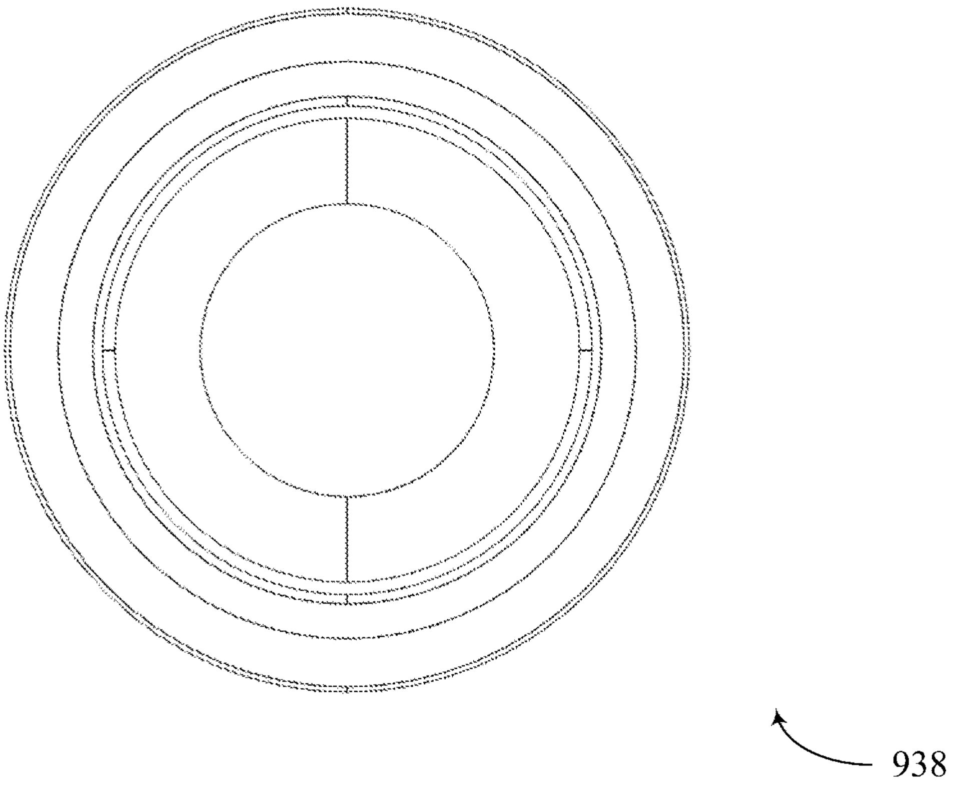
FIG. 11B is top view of the example bowl of FIG. 11A according to aspects of the disclosure.
Figure 11C:
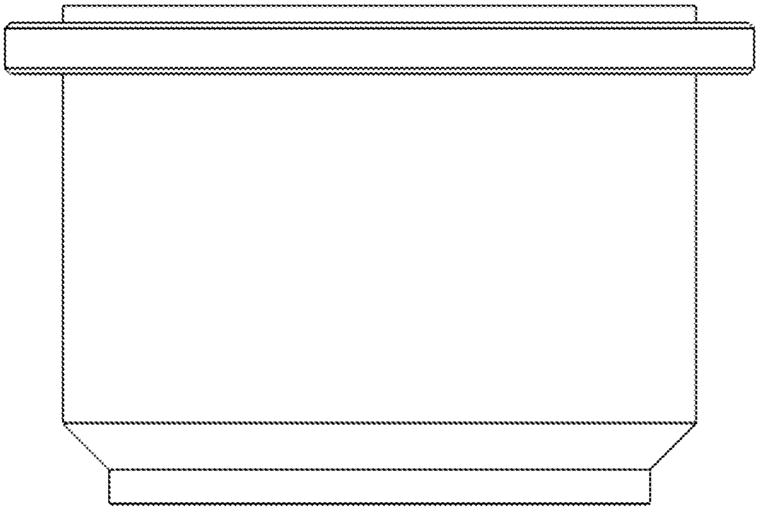
FIG. 11C is a left side view of the bowl of FIGS. 11A and 11B according to aspects of the disclosure.
Figure 11D:
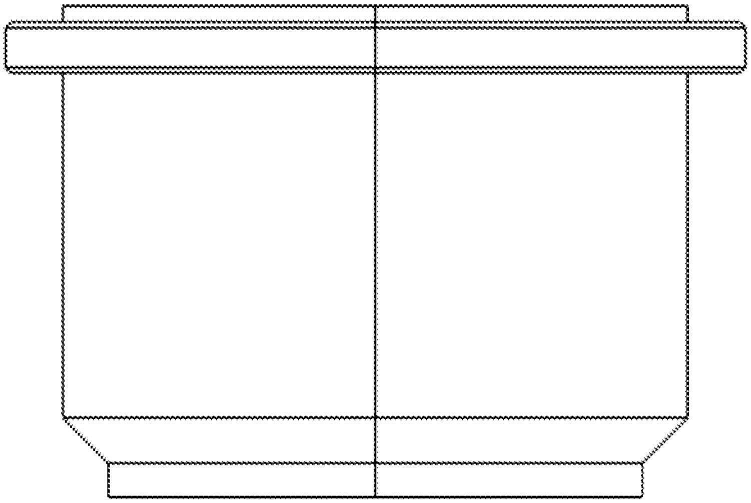
FIG. 11D is a rear view of the bowl of FIGS. 11A-11C according to aspects of the disclosure.
Figure 11E:
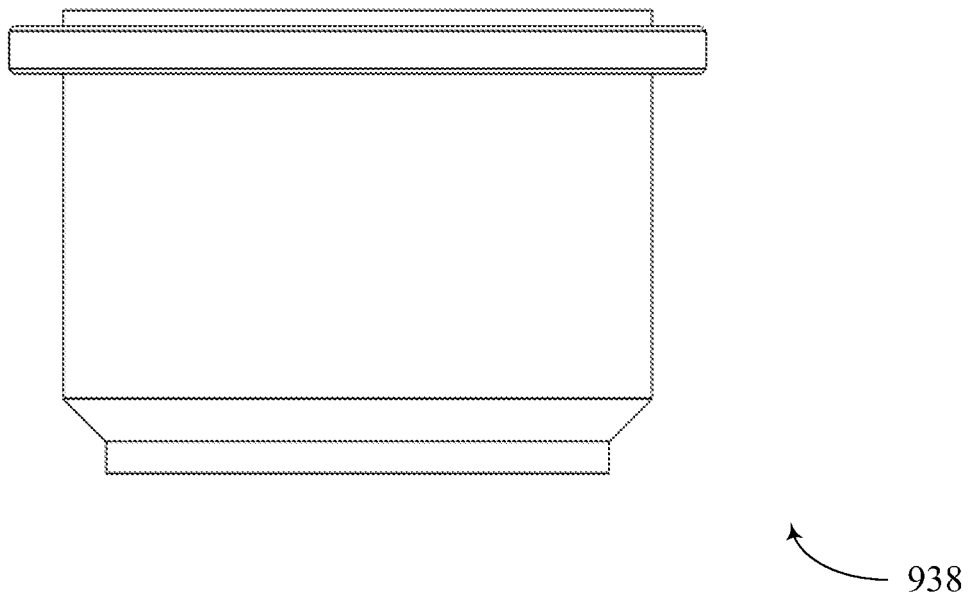
FIG. 11E is a right side view of the bowl of FIGS. 11A-11D according to aspects of the disclosure.
Figure 11F:
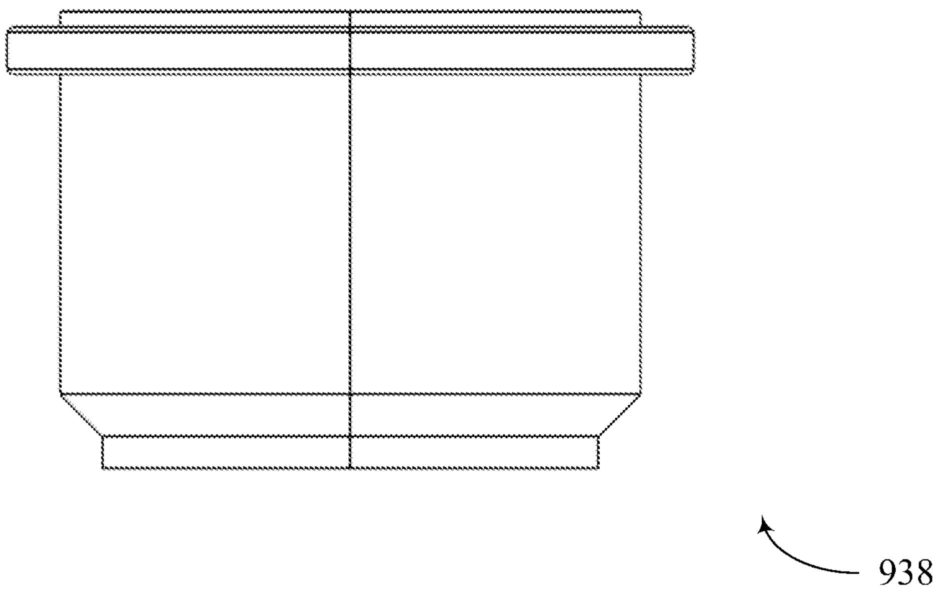
FIG. 11F is a front view of the bowl of FIGS. 11A-11E according to aspects of the disclosure.
Figure 11G:
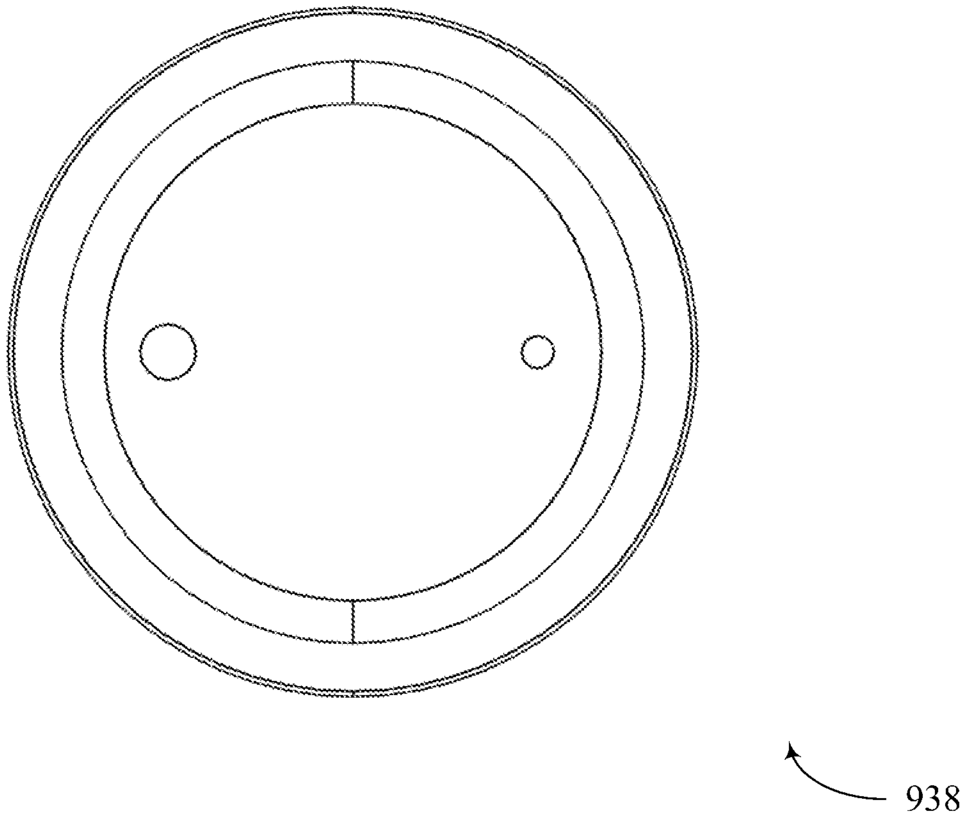
FIG. 11G is a bottom view of the bowl of FIGS. 11A-11F according to aspects of the disclosure.

FIG. 6 illustrates an example of a grinding container 112 usable with a clamping mechanism (e.g., clamping system 116 described above). As mentioned above, one non-limiting example use of the clamping mechanism and/or grinding container is with a planetary ball mill. The grinding container 112 may include a lid 134 and a bowl 138. The lid 116 may include protrusion 142 configured to engage with a concave portion of the clamping member 344 of. In one example, the lid may include a substantially flat surface 143 with the protrusion 142 including an upper surface **142*b* and a beveled or angled second surface 142*a*. The upper surface 142*b* and beveled or angled surface 142*a* may be configured to fit within or otherwise engage with similarly dimensioned beveled or angled second surface 442*a* (FIG. 2) and/or an upper surface 442*b* of the clamping member 344. FIG. 7 illustrates a section view of the grinding container 112 engaged with the clamping system 116. The aforementioned protrusion of the grinding container 112 and matching concave portion of clamping member 344 may ensure that the container 112 and/or lid 134 is properly centered when the container is clamped within the clamping system 116. Further, the aforementioned protrusion of the grinding container 112 and matching concave portion of clamping member 344 may ensure that the lid 134 is properly sealed with respect to the bowl 138 when the container is secured within the clamping system 116. The lid 134 of the grinding container 112 may further include a sealing member such as an O-ring 144 (FIG. 7). The O-ring may for example be replaceable to allow the grinding container 112 to be reused or refurbished if the seal 144 is damaged or worn. The container may 112 may further include an alignment member on the bottom thereof. For example as shown in FIG. 9F, the bottom of the grinding container may include a concave portion 405 configured to receive or otherwise engage with an alignment pin 305 (FIG. 3) of the base plate 304. The engagement between the concave portion 405 and the alignment pin 305 may further assist with the alignment of the container within the clamping system 116 and may further ensure that the container does not loosen or otherwise move with respect to the clamping system 116**.

Figure 7B:
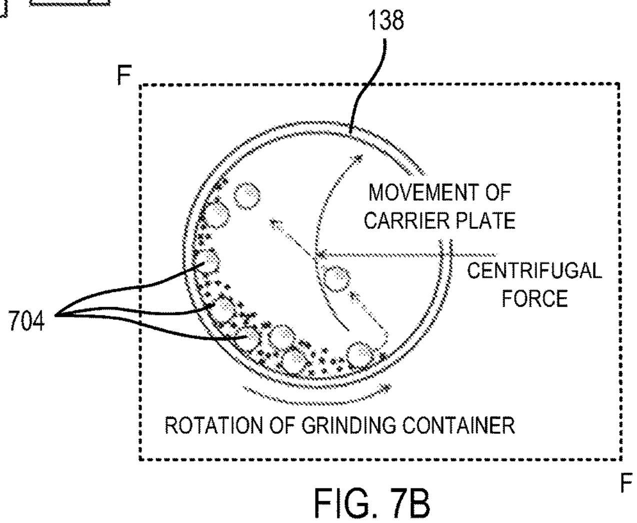
FIG. 7B is a view of one example of ball movement within the grinding container of the ball mill.

FIG. 7 shows an example of the operation of the grinding container 112. As shown in FIG. 7, an amount of material to be ground 700 and a plurality of grinding balls 704 may be placed into the bowl 138. In operation, grinding container 112 rotates about the axis A and/or about axis AA (FIG. 1). The arrows in FIG. 7B indicate movement of the grinding balls 704 and the ball mill during rotation. During rotation, centrifugal motion causes the grinding balls 704 to travel along the perimeter of the bowl 138. The balls 704 travel around the perimeter of the jar until they reach a critical point when they fling across to the opposite wall of the jar as indicated by the broken arrows in FIG. 7B. The movement of the balls 704 through the material 700 results in both shearing and impact forces. The impact of the balls 704 crushes larger chunks of the material to be ground and the shearing grinds the material to be ground to a fine powder. During the process of grinding the material 700, the Balls 704 may be replaced with balls having different dimensions and/or mass. For example, a user of the ball mill may wish to mill or grind the material to be ground 700 to a very small (nano) particle size, the user may first grind the sample using a first size of balls, and then grind the sample using a second size of balls that are smaller than the first size of balls.

Figure 8:
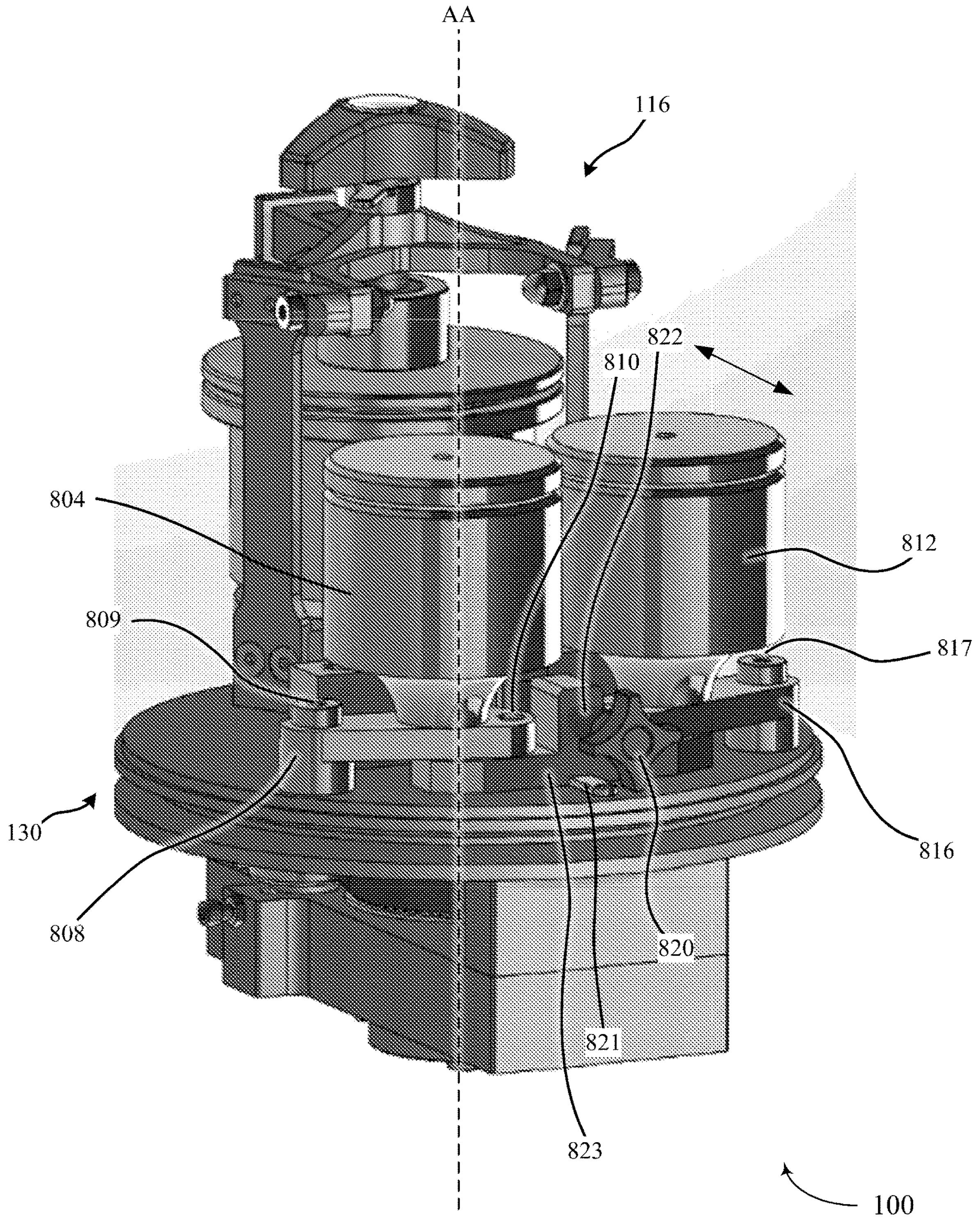
FIG. 8 is a rear perspective view of the ball mill of FIGS. 1-5.

Referring now to FIGS. 1, 2, and 8, in one aspect of the disclosure a balancing system in disclosed. The balancing system may for example be used in conjunction with the aspects described above and/or may be used separately to provide a system or method for balancing a planetary ball mill. One example of a ball mill 100 with the example clamping system balancing system 116 is usable with the ball mill that includes a motor 104, a gear train 108 (hidden from view in FIGS. 1 and 2), a grinding container 112. The motor 104 is configured to drive the gear train 108. The gear train 108 may for example be a planetary gear system.

For example, an output shaft of the motor 104 may be coupled to a sun gear (not shown) of the gear train 108. The sun gear may engage and drive one or more planetary gears (not shown) coupled to a ring gear. The ring gear may be coupled to or formed in a carrier plate 130. A clamping system 116 configured to secure a grinding container and a balancing system 120 are coupled to the carrier plate 130 such that the clamping system 116 and the balancing system 120 rotate with the carrier plate 130 (e.g., about axis AA shown in FIG. 1). Further, any one or combination of the planetary gears may cause rotation of the clamping system and/or grinding container clamped therein about axis BB shown in FIG. 1. During the aforementioned rotation, performance of the ball mill may be improved by providing a counterweight to prevent excessive vibration or "walking" of the planetary ball mill. Further, because the ball mill is useable with different media, balancing of the ball mill requires adjustment due to different weights of media that may be placed in the grinding container. In one aspect an adjustable balancing system is disclosed.

The balancing system 120 includes a first counterweight 804, a first linkage 808, a second counterweight 812, and a second linkage 816. The first counterweight 804 may be coupled to the carrier plate 130 via the first linkage 808. The second counterweight 812 may be coupled to the carrier plate 130 via the second linkage 816. As the carrier plate rotates 130, the first and second counterweights 804 and 812 counterbalance the movement of the grinding container 112 and the contents therein during rotation. The first and second counterweights may be configured to be adjustable toward and away from the central rotational axis of the carrier plate 130. For example, The balancing system 120 may include a knob 820 that may be actuated (e.g., rotated) to change a distance that the first and second counterweights 804, 812 are relative to the center of the carrier plate 130 during rotation as denoted by the arrows in FIG. 8. For example, when the load in the grinding container 112 is heavy, an operator may actuate (e.g., rotate) the knob 820 to increase the distance that the first and second counterweights 804, 812 are relative to the center of the carrier plate 130. For example, when the load in the grinding container 112 is light, an operator may actuate the knob 820 to decrease the distance that the first and second counterweights 804, 812 are relative to the center of the carrier plate 130 during rotation. When the load in the grinding container 112 is high, the operator may actuate the knob to increase the distance that the first and second counterweights 804 and 812 are relative to the center of the carrier plate.

In one example, the first linkage 816 may be connected at a first end to a sliding mount 823, the sliding mount 823 may for example be configured to move linearly toward and away from the center of rotation of the carrier plate 130 via a track 821 when the knob 820 is rotated in a first direction or a second direction. For example, the knob 820 may be connected to a threaded shaft 822 that is configured to threadingly engage with a threaded portion of the sliding mount 823. Turning the knob 820 causes the threads of the threaded shaft 822 to advance and causes linear motion of the sliding mount 823 along track 821. Both the first linkage 808 and the second linkage 816 may be pivotally connected to the sliding mount 823 at a first end at carrier plate pivots 809 and 817 at a second end. Thus, as the sliding mount moves away from or towards the central axis AA of the carrier plate 130 the counterweights 804 and 812 move both towards or away from the central axis AA and closer to and further away from one another which further assists with the stabilization of the carrier plate 130 during ball mill operation. The aforementioned configuration allows a user to efficiently balance the carrier plate 130 of the ball mill. In one example, additional counterweights may be added to balance a larger container, multiple containers, and/or heavier sample and/or ball weights. For example, additional weights may be added to the top of each one of counterweights 804 and/or 812.

FIGS. 9A-9G show an example grinding container design usable with aspects of the disclosure. In one example implementation the grinding container 912 may be analogous to grinding container 112 described above.

FIGS. 10A-10G show views of a lid design usable with aspects of the disclosure. In one example implementation the lid 934 may be analogous with grinding container lid 134 described above.

FIGS. 11A-11G show views of an example bowl design usable with aspects of the disclosure. In one example implementation the bowl 938 may be analogous with bowl 138 described and above.

It is noted that any one or a combination of the components mentioned above may be provided as a kit and may come pre-packaged as a kit or system with instructions for use.

This written description uses examples to disclose aspects of the invention, including the preferred embodiments, and also to enable any person skilled in the art to practice the aspects thereof, including making and using any devices or systems and performing any incorporated methods. The patentable scope of these aspects is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims. Aspects from the various embodiments described, as well as other known equivalents for each such aspect, can be mixed and matched by one of ordinary skill in the art to construct additional embodiments and techniques in accordance with principles of this application.

The invention claimed is:

1. A clamping system for a planetary ball mill, the clamping system comprising:

a base;

a plurality of support arms connected to the base;

a clamping lid connected to the plurality of support arms and including a clamping mechanism configured to clamp a grinding container between the base and the clamping mechanism, wherein the clamping lid is pivotally coupled to the plurality of support arms and is configured to pivot with respect to the base from a closed position to an open position, wherein in the open position the grinding container is removable from the clamping system; and a rotatable arm connected to the base and configured to pivot from a first position to a second position, wherein in the first position the rotatable arm prevents the clamping lid from rotating to the open position.

2. The clamping system of claim 1, wherein when the rotatable arm is in the second position, the clamping lid is rotatable to the open position.

3. The clamping system of claim 1, wherein the plurality of support arms are fixed arms are fixedly coupled to the base.

4. The clamping system of claim 1, wherein the rotatable arm includes a notch configured to engage a boss of the clamping lid.

5. The clamping system of claim 1, wherein in the closed position, the clamping lid engages the grinding container and in the open position the clamping lid is spaced from the grinding container.

6. The clamping system of claim 5, wherein when the clamping lid is in the closed position, the clamping mechanism is configured to bias a lid of the grinding container towards the base of the clamping system to provide engagement between the lid and a bowl of the grinding container.

7. A clamping system for a planetary ball mill, the clamping system comprising:

a base;

a plurality of support arms connected to the base;

a clamping lid connected to the plurality of support arms and including a clamping mechanism configured to clamp a grinding container between the base and the clamping mechanism, wherein the clamping lid is configured to pivot with respect to the base from a closed position to an open position, wherein in the open position the grinding container is removable from the clamping system; and a rotatable arm connected to the base and configured to pivot from a first position to a second position, wherein in the first position the rotatable arm prevents the clamping lid from rotating to the open position, wherein in the closed position, the clamping lid engages the grinding container and in the open position the clamping lid is spaced from the grinding container, wherein when the clamping lid is in the closed position, the clamping mechanism is configured bias a lid of the grinding container towards the base of the clamping system to provide engagement between the lid and a bowl of the grinding container, and wherein the clamping mechanism comprises a threaded rod that is configured to be rotated causing the clamping mechanism to tighten against the lid of the grinding container.

8. The clamping system of claim 1, wherein the clamping mechanism further comprises a clamping member with an engagement member with at least one surface configured to engage with a corresponding surface of an engagement member on a lid of the grinding container.

* * * * *